Patented Dec. 29, 1925.

1,567,061

UNITED STATES PATENT OFFICE.

LESTER KIRSCHBRAUN, OF CHICAGO, ILLINOIS.

PROCESS OF MAKING BITUMINOUS EMULSIONS.

No Drawing. Application filed January 17, 1921, Serial No. 438,050. Renewed March 31, 1924.

*To all whom it may concern:*

Be it known that I, LESTER KIRSCHBRAUN, a citizen of the United States, residing in the city of Chicago, county of Cook, and State of Illinois, have invented certain new and useful Improvements in Processes of Making Bituminous Emulsions, of which the following is a specification.

This invention relates to improvements in process of making bituminous emulsion and refers more particularly to aqueous bituminous emulsions in which the adhesive particles of bituminous or like substances are enveloped in a non-adhesive film or coating rendering the emulsion non-adhesive.

Among its salient objects are to provide a process or method of making emulsions of bituminous or other adhesive substances by emulsifying the same with clay or like colloidal particles in an aqueous liquid with the addition of a third substance which has a characteristic of causing the non-adhesive coating surrounding each of the dispersed adhesive particles to more firmly envelop the adhesive bitumen or like adhesive substance dispersed through the emulsion so that the emulsion is very resistant to pressure, dilution or any other factor commonly tending to disintegrate the enveloping non-adhesive coatings; to provide a process in which, by means of the addition of a third substance, the clusters of non-adhesive particles surrounding the adhesive material in the emulsion are caused to cling tenaciously to the adhesive substance, making the emulsion substantially more permanent in its character; to provide a process in which, during the combination of the emulsifying and adhesive substances, the surface of the emulsion is kept constantly covered by the emulsifying agent whereby the formation of oily or greasy particles is obviated, producing a non-adhesive emulsion; to provide a process in which, due to the addition of a third substance, which is slightly acid in character, the formation of the oil particles produced during emulsification is reduced materially, and, in general, to provide a process of the character referred to.

In carrying out commercially the invention described in Letters Patent No. 1,302,810 issued May 8, 1919, and as supplemented by subsequent applications and particularly an application Serial No. 274,497, filed February 1, 1919, it has been the practice to produce a non-adhesive emulsion by dispersing adhesive bituminous binders with an emulsifying agent such as colloidal clay in an aqueous vehicle.

The bituminous material is, of course, in the dispersed phase while the water constitutes the continuous phase of such emulsion, the colloidal clay particles acting to coat or enclose the dispersed particles of bituminous binder probably by adsorption thereby protecting the particles of binder from adhesiveness. Under certain conditions when for example, large proportions of asphalt were dispersed with small amounts of clay or when the emulsion, after being made, was subjected to extreme dilution with water, I have found the insulating or protecting quality of the clay particles could be effectively increased by the use of a fixing agent which caused the clay to cling or cluster more tenaciously about the particles of bituminous material. This function of the clay can be readily observed by microscopic examination of the emulsion, particularly with the use of stains such as malachite green which bring the clay particles into effective view. In other words, the third substance acts as a flocculating agent.

The formation of these free oily particles in the emulsion, which seems to take place to a greater extent upon the hot surface thereof, was objectionable when it was desired to run the emulsion over a paper machine with fibrous stock or in other manufacturing uses when a maximum degree of non-adhesiveness was desired. From experimentation, it has been learned that a slight alkalinity of the clay promotes this oily condition of the emulsion. Lime in the clay will give like results and by adding alkali into the clay during emulsification, the tendency to produce oily particles is greatly accelerated.

To obviate this objectionable tendency, I add a third substance, having a slightly acid reaction and having the purposes of a flocculating agent, to the emulsifying agent in its aqueous vehicle. Such substances as aluminum sulphate, sodium acid phosphate and others of a similar character supply elements to the emulsion which obviate the formation of these oily particles upon the surface of the emulsion during the mixing and, in addition, tend to cause the particles of emulsifying agent to cluster around the adhesive substance dispersed through the emulsion as before described. The addition of a third substance, such as aluminum sulphate, to an amount of one to fifteen percent of the emulsifying agent in the emulsion is satisfactory to produce these results. However, it is understood that the quantity and concentration of this third substance is susceptible of variation according to its character and may be regulated according to the quality of the emulsifying agent used and the character of the bituminous adhesive substance to be emulsified. The character and concentration of this third substance is of course such as to achieve the objects herein stated, namely to protect the dispersed particles and not produce coalescence or breaking up of the emulsion, which would render it unfit for the purpose intended. In producing this emulsion, the emulsifying agent, which may be clay, is thoroughly mixed in an aqueous vehicle and the third substance, which, as described, may be aluminum sulphate, sodium acid phosphate or numerous other materials having a slightly acid reaction or substances giving the above described results and not having the acid reaction, for example, of calcium chloride, is added to the aqueous suspension. This suspension is combined with the asphalt in a mixer in which there are large paddles kept constantly revolving to thoroughly disperse the bituminous substance through the emulsifying liquid. The construction of this mixer is of importance as one of the essential factors in the formation of the emulsion is that the surface of the emulsion must be kept at all times covered by the emulsifying agent which is added. While I am not exactly certain of the causes of this oily formation, its appearance, when the hot emulsion contacts with air, seems to indicate some influence of the air in promoting what appears to be a capillary fractionation of some of the asphaltic particles. It is this keeping of the surface of the emulsion constantly covered in connection with the reagent used which reduces the formation of the oil particles during emulsification.

By placing the revolving paddles on a vertical shaft within an inner open-ended cylinder and causing a circulation of the emulsion downward through the inner cylinder and upward about the annular space between the inner and outer cylinder and simultaneously with this circulation adding the emulsifying agent in its aqueous vehicle to the outer circumference of the upper emulsion surface, the emulsifying agent is caused to flow inwardly with the emulsion completely covering its surface. During this operation the emulsion is in the form of a stiff paste and sluggish to accelerate during mixing. It may be mentioned in this regard that the third substance added to assist in causing the non-adhesive particles of the emulsifying agent to more firmly envelop the adhesive particles of the bituminous substances assists the emulsifying agent in reducing the formation of the oil particles on the surface of the emulsion, a factor which may be due to the character of the material itself or to the fact that it gives the emulsifying agent the tendency to cling to the adhesive particles and, therefore, more completely protect those exposed on the surface during the initial mixing.

While the effect of the fixing agent is substantially the same whether added before or after the formation of the emulsion, if desired to reduce the oily formation, it is preferably added with clay and water prior to emulsification.

I claim as my invention:—

1. A process of forming a non-adhesive emulsion consisting in emulsifying an adhesive bituminous substance with an emulsifying agent in an aqueous vehicle, and adding a flocculating agent to the emulsion to cause the emulsifying particles to more tenaciously cluster about the adhesive substance.

2. A process of forming a non-adhesive emulsion, consisting in emulsifying an adhesive bituminous substance with colloidal clay in an aqueous vehicle, adding aluminum sulphate to the emulsion to cause the emulsifying particles to more tenaciously gather about the bituminous substance.

3. A process of forming a non-adhesive emulsion, consisting in emulsifying a bituminous substance in an aqueous vehicle with an emulsifying agent, adding aluminum sulphate to flocculate the emulsified particles and cause them to more tenaciously gather about the bituminous substance.

LESTER KIRSCHBRAUN.